United States Patent [19]

Hashiyama et al.

[11] Patent Number: 4,573,201

[45] Date of Patent: Feb. 25, 1986

[54] DATA PROCESSING METHOD OF BINARY GRAPHIC PATTERN AND SYSTEM THEREFOR

[75] Inventors: Hideshi Hashiyama; Shuichi Araki, both of Kyoto; Michio Ogura, Shiga, all of Japan

[73] Assignee: Dainippon Screen Seizo Kabushiki Kaisha, Kyoto, Japan

[21] Appl. No.: 556,431

[22] Filed: Nov. 30, 1983

[30] Foreign Application Priority Data

Dec. 1, 1982 [JP] Japan ............................... 57-211155

[51] Int. Cl.$^4$ ............................................... G06K 9/50
[52] U.S. Cl. ....................................... 382/56; 358/261
[58] Field of Search ...................... 382/56, 22; 358/261

[56] References Cited

U.S. PATENT DOCUMENTS 4,020,462 4/1977 Morrin, II ............................ 382/56
4,189,711 2/1980 Frank .................................. 382/56

*Primary Examiner*—Leo H. Boudreau
*Attorney, Agent, or Firm*—Hayes, Davis & Soloway

[57] ABSTRACT

Data on the characteristic point on the contours of unit patterns such as characters, marks, patterns and/or the like are stored in a memory. The data are then read out as needed and then subjected to magnification-changing processing such as enlargement or reduction, rotation processing and/or the like. The resulting unit pattern data are then arranged in accordance with a given layout so as to establish desired positional relationship among the unit patterns. The thus-arranged pattern data are then converted into one-dimensional time series data so as to ON-OFF control the scanning and exposing means of a one-dimensional output unit. The above method permits to process a pattern in a single step. The specification also discloses a system useful in the practice of the above method.

10 Claims, 15 Drawing Figures

DATA PROCESSING METHOD OF BINARY GRAPHIC PATTERN AND SYSTEM THEREFOR

BACKGROUND OF THE INVENTION

1. Field of the Invention

This invention relates to a data processing method for converting data on a graphic pattern such as a character font, which data are expressed in terms of binary signals, into one-dimensional time series data so as to record the graphic pattern by successively scanning same and a system adapted to practice the data processing method. More particularly, the present invention relates to a data processing method for exposing and recording characters, marks, patterns and/or the like laid out at the input station of a computerized phototypesetting machine to complete a single picture frame on a photosensitive material such as photographic film or paper by means of a one-dimensional output unit (for example, picture scanning and recording means such as electronic color scanner) and a system suitable for use in the practice of the data processing method.

By the term "characters" as used herein, is meant general Chinese charactes, "hiragana" characters, "katakana" characters, Roman letters, etc. The term "marks" mean designed characters and letters such as logotypes and the like as well as other marks. On the other hand, the term "patterns" mean various patterns such as circles, ellipses, etc., which may be represented by curvilinear equations.

2. Description of the Prior Art

There has heretofore been unknown any means which can record a pattern containing characters, marks, patterns and the like in combination in a single step by means of a one-dimensional output unit. Nothing has been materialized, particularly, where the size of a pattern frame to be recorded is of relatively large one, for example, as large as the size of a newspaper page.

Accordingly, such a demand has conventionally be fulfilled in such a way that the marks, patterns and the like are drawn for example by a coordinate plotter and the characters, numerals, symbols and the like are on the other hand set and recorded as a desired composition by means of a photocomposing machine, and the thus-drawn marks, patterns and the like and the thus-recorded composition are then arranged and fixedly glued on a base sheet in accordance with a prescribed layout so as to form an original plate pattern having a size equivalent to one full page.

Such a conventional method is however accompanied by such drawbacks that considerable time is required in preparing characters, patterns and the like as individual unit patterns, positioning them on a base sheet and then gluing them on the base sheet, leading to an imminent high production cost and the accuracy of the positioning of the unit patterns in poor upon their gluing.

SUMMARY OF THE INVENTION

An object of this invention is to improve such drawbacks of the prior art method and to provide a novel method for converting a pattern containing various binary image such as characters, marks and patterns into one-dimensional time series data so as to materialize the processing of the pattern in a single step.

Another object of this invention is to provide a system suitable for use in the practice of the above method.

The present inventors have found that the above objects of this invention can be achieved by storing data on the characteristic points on the contours of unit patterns such as characters, marks, patterns and/or the like in a memory, reading out the data as needed, subjecting the thus read-out data to magnification-changing processing such as enlargement or reduction, rotation processing and/or the like, arranging the resulting unit pattern data in accordance with a given layout so as to establish desired positional relationship among the unit patterns, and then converting the thus-arranged pattern data into one-dimensional time series data so as to ON-OFF control the scanning and exposing means of a one-dimensional output unit. On the basis of the above finding, the present invention has been completed.

In one aspect of this invention, there is thus provided a method for converting a graphic pattern expressed in terms of binary signals into run-length data so as to duplicate and record the graphic pattern, said method including storing the graphic pattern in a memory on the basis of data on the contours of the graphic pattern and controlling the output of a one-dimensional output unit in accordance with the latter data, which method comprises:

- outputting data on each of the line segments, which respectively and successively connect adjacent characteristic points on the contours of the graphic pattern, in accordance with the coordinate values of the mutually-adjacent two characteristic points between which the line segment extends;
- determining the Y-coordinate value of the crossing point between each scanning line in the Y-axis direction and each of the line segments in the one-dimensional output unit;
- discriminating, on the basis of the order of each of the characteristic points and the relative magnitude of the X-coordinate value of each of the adjacent characteristic points, whether the crossing point is positioned at either the leading edge portion or the trailing edge portion of the black region of the pattern relative to the scanning direction of the scannihg line; and
- controlling the output of the one-dimensional output unit in accordance with the Y-coordinate value of the crossing point and the result of the discrimination.

In another aspect of this invention, there is also provided a system for processing data on a binary graphic pattern, comprising:

- a first memory adapted to store the graphic pattern expressed in terms of binary signals by means of the X-Y coordinate values of each characteristic point on each contour of the graphic pattern;
- a data conversion unit adapted to read out data stored in the first memory and convert same in accordance with a desired layout;
- a second memory adapted to store the thus-converted data;
- a unit adapted to generate, on the basis of the data from the second memory, data indicating whether the line segments which respectively connect the mutually-adjacent characteristic points of the graphic pattern are individually located at the record-starting side or the record-finishing side relative to the scanning direction of a scanning line;
- a third memory adapted to store the data on the line segments;

a scanning line controlling unit adapted to generate scanning line controlling data so as to scan the area of the layout successively in the direction of the Y-axis;

a unit adapted to calculate the Y-coordinate value of each of the crossing points of the scanning lines and line segments on the basis of the line segment data stored in the third memory and the scanning line controlling data;

a fourth memory adapted to store the Y-coordinate value; and a unit adapted to produce, in accordance with the Y-coordinate values stored in the fourth memory and the data indicating whether the crossing points are each located at either the record-starting side or record-finishing side, run-length data for controlling a recording output unit.

The present invention accordingly provides a method for converting individual fonts such as characters, marks, patterns and the like stored respectively as digital data in the so-called computerized typesetting machine into their corresponding run-length data which are required to scan a pattern arranged in accordance with a prescribed layout by means of, for example, a one-dimensional output unit such as electronic color scanner. The above method enjoys a high degree of utility, because it permits the conversion of data without failure and the free selection of black-to-white or white-to-black changes at overlapped areas of patterns.

The above and other objects, features and advantages of the present invention will become apparent from the following description and the appended claims, taken in conjunction with the accompanying drawings.

BRIEF DESCRIPTION OF THE DRAWINGS

FIG. 2 illustrates modifications of the pattern shown in FIG. 1, in which FIG. 2(A) depicts the original pattern, FIG. 2(B) shows a pattern obtained by subjecting the original pattern to enlargement processing, FIG. 2(C) shows a pattern obtained by vertically elongating the original pattern, FIG. 2(D) illustrates a pattern obtained by flattening the original pattern, FIG. 2(E) depicts a pattern obtained by inclining the original pattern, and FIG. 2(F) shows a pattern obtained by rotating the original pattern;

DETAILED DESCRIPTION OF THE INVENTION AND PREFERRED EMBODIMENTS

Figure 1:
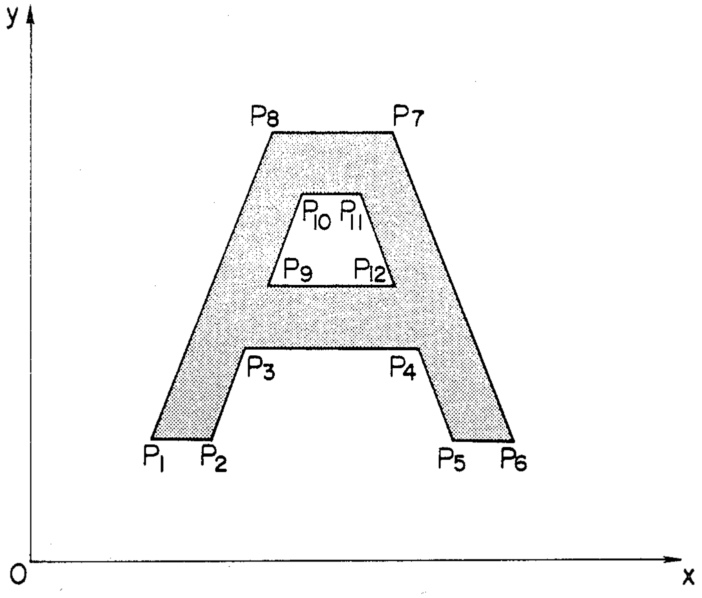
FIG. 1 is a drawing showing one example of a pattern such as a character font to be expressed in terms of binary signals.

A pattern such as a character font or the like, which is to be expressed in terms of binary signals, may be represented as a single closed region or a combination of a plurality of closed regions. For example, a letter "A" shows in FIG. 1 is a pattern which has two closed regions formed respectively by a contour connecting points $P_1$–$P_8$ and another contour connecting points $P_9$–$P_{12}$. Here, each of the points $P_1$–$P_{12}$ is a characteristic point which is required to define the letter "A".

Since both contours are composed of straight lines in the above example, it is only necessary to specify each of the corners of the contours. If a contour is formed of curves, each of the vertexes of an approximated polygon inscribed in (or circumscribed over) the contour is selected as a characteristic point.

Data on each character, mark, pattern or the like are stored in terms of coordinate values, which represent positions of characteristic points in a coordinate system intrinsic to the font, in a memory (original font data memory). In this case, the orders of the characteristic points are determined respectively in every contours forming the closed loops. The order of each characteristic point is determined by first finding out the direction of its respective contour, which direction is in turn determined by setting which side of a line segment connecting the characteristic point and its adjacent characteristic point the black region of the pattern is placed, and then determining the order of the characteristic point on the basis of the direction of the contour.

In addition, the number of the closed loops and the number of characteristic points on each closed loop are also stored as font data in the memory. In the example illustrated in FIG. 1, "2", "8" and "4" are stored in the memory respectively as the number of the closed loops, the number of the characteristic points on the first closed loop and the number of the characteristic points on the second closed loop, in combination with the coordinate values of the twelve characteristic points.

Following the above-described procedure, font data on necessary characters, marks, patterns and the like are Call stored in a memory and, upon laying out a composition, and required font data are read out and then written in another memory in accordance with an arrangement conforming with the layout of the compostion, thereby storing them as exposure image data.

Since data on each font are stored by means of coordinate values, which have their origin in its respective font pattern region, in a first memory (hereinafter called "original font memory"), they are first converted into coordinate values which the font will have when arranged in accordance with a given layout and the thus-converted font data are written in an exposure image data memory. More specifically speaking, it is only necessary to convert the coordinate values of each characteristic point into coordinate values which are obtained by adding the coordinate values of the origin, at which coordinate values the origin is located when the font pattern has been arranged in accordance with the layout, to the original coordinate values of the characteristic point.

When magnification-changing processing, angular transformation processing, rotating processing or the like is required, exposure image data should be composed of data obtained after effecting such processing.

These processings are carried out to use font patterns in actual phototypesetting work after deforming the font patterns in accordance with each layout design. Several examples of such modifications are illustrated in FIG. 2.

Figure 2:
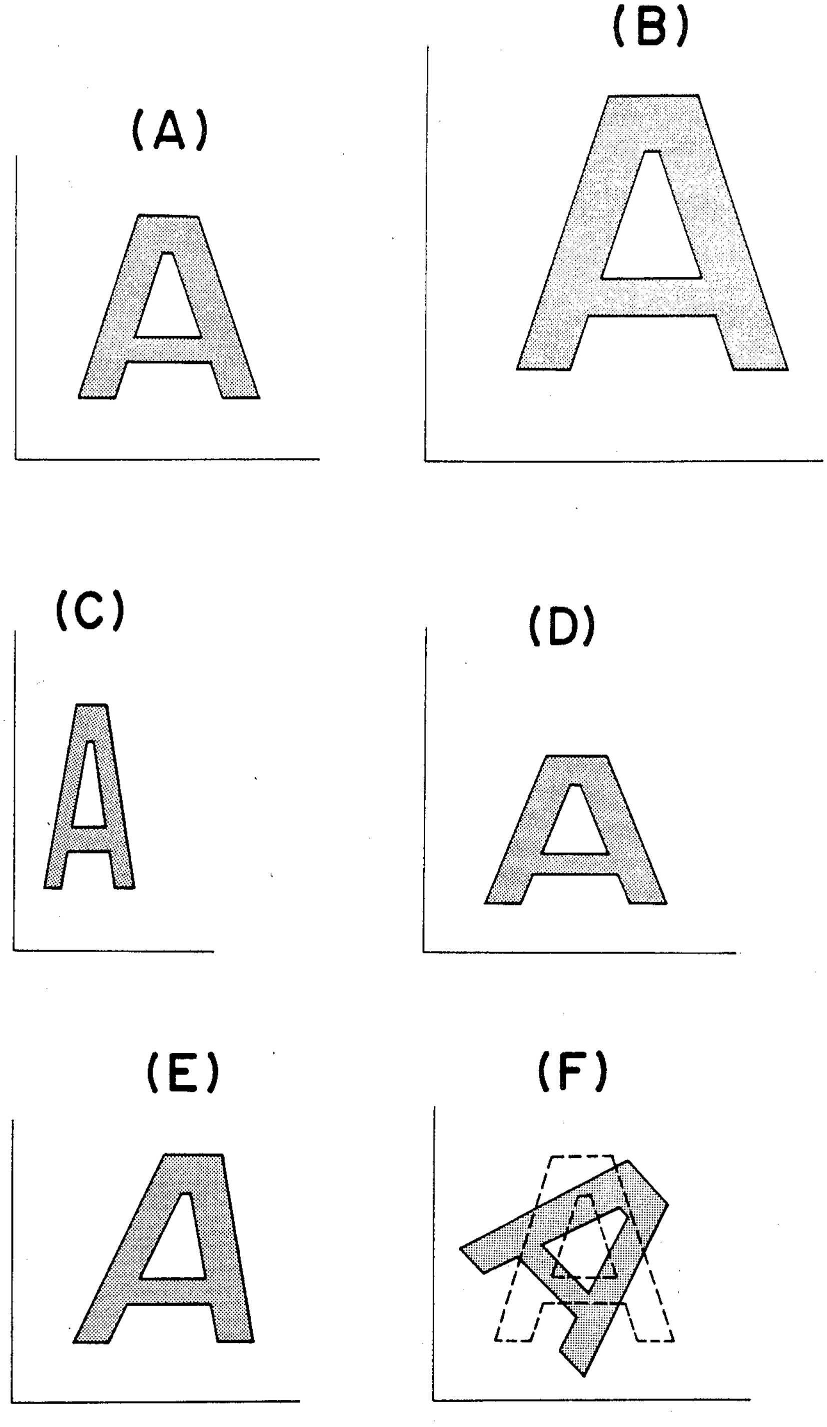

FIG. 2 schematically illustrates a pattern subjected to magnification-changing processing (B) (the illustrated pattern has been obtained by enlarging the original pattern; the original pattern may also be reduced in size), a pattern (C) obtained by vertically elongating the original pattern (A), a pattern (D) obtained by flattening the original pattern (A), a pattern (E) obtained by inclining the original pattern (A), and a pattern (F) obtained by rotating the original pattern (A), respectively. Each of these processings can be carried out in the following manner.

The magnified pattern (B) is obtained by multiplying each of the X-Y coordinate values of the characteristic points of the original pattern (A) with a desired value so as to obtain new coordinate values.

The elongated pattern (C) and flattened pattern (D) are obtained by multiplying only the X-coordinate values and the Y-coordinate values with desired values so as to obtain new coordinate values respectively.

When the X-coordinate values are changed respectively by values proportional to their corresponding Y-coordinate values, the inclined pattern (E) is obtained.

The rotated pattern (F), which has been obtained by rotating the original pattern (A) over a rotation angle $\theta$, can be obtained by determining in accordance with the following equation new coordinate values which the rotated pattern (F) has:

$$x' = \cos\theta \cdot x - \sin\theta \cdot y$$

$$y' = \sin\theta \cdot x - \cos\theta \cdot y$$

where (x,y): coordinate values of a characteristic point on an original pattern;

(x′,y′): coordinate values of the correspoinding characteristic point on a rotated pattern; and $\theta$: rotation angle.

With respect to graphic patterns other than characters, for example, circles or ellipses, it is advatageous from the practical viewpoint to obtain data on each contour on the basis of its curvilinear equation. It is of course possible to store these graphic patterns in the font memory by the same method as the above-described character fonts. It is however preferable to produce data on each pattern contour of desired dimensions as exposure image data whenever necessary, because the picture elements of an original pattern are enlarged as they are, the discontinuity (ruggedness) of each contour becomes noticeable and the picture quality is hence deteriorated when the original pattern is subjected to magnification-changing processing, especially, in case of being enlarged.

Based on the data which have been stored in the exposure image data memory and contains characters, patterns and the like arranged in accordance with the required layout, the one-dimensional output unit is controlled. In order to scan and expose the pattern which has been laid out above, it is necessary to obtain, as control data, information on the coordinate values of points where the scanning line in each scanning cycle of the output unit crosses with the contour as well as further information about whether each of the crossing points is an exposure-starting point or exposure-finishing point.

These information can be obtained in the following manner.

Taking the pattern illustrated in FIG. 1 as an example, the direction of each scanning line is supposed to be parallel to the y-axis and the pattern is supposed to be scanned from the top toward the bottom. In addition, the scanning line is supposed to move 1 pitch by 1 pitch from the left to the right in the direction of the x-axis per every single scanning cycle. Since the data on each contour are obtained as data on the line segments successively connecting the characteristic points which data have been stored in terms of their respective X-Y coordinate values, a Y-coordinate value "y" of the crossing point between a scanning line and the contour is determined in accordance with the following equation provided that the X-coordinate value "x" of the scanning line is determined.

$$y = (\Delta y \times N) + y_n$$

where $$y = \frac{\dfrac{y_{n+1} - y_n}{x_{n+1} - x_n}}{p}$$

in which ($x_n$, $y_n$) the coordinate values of a characteristic value $p_n$;

($x_{n+1}$, $y_{n+1}$) the coordinate values of the characteristic value $p_{n+1}$;

N: the number of scanning operations which use the point $p_n$ as the starting points . . .

$$\left(N = \frac{x - x_n}{p}\right)$$

p: the pitch of scanning lines.

Since $\Delta y$ takes a constant value for a line segment of one section, the arithmetic operation may be simplified if the above constant value is added successively to the Y-coordinate value "$y_n$" of the first scanning line (namely, the scanning line passing through the point $p_n$).

The discrimination whether each crossing point is the starting point of the exposure or the finishing point of the exposure is carried out by finding out whether the corresponding line segment is located above or below the black region of the pattern.

In the present specification, a line segment lying at the upper edge side of a pattern will be called "black below" whereas a line segment located at the lower edge side of the pattern will be called "white below". Thus, needless to say, the crossing point on a "black below" line segment becomes an exposure-starting point and the crossing point on a "white below" line segment becomes an exposure-finishing point.

The discrimination whether the line segment connecting adjacent characteristic points is "black below" or "white below" is carried out by comparing in magnitude the X-coordinate values of the characteristic points in accordance with the orders of the characteristic points.

Namely, the X-coordinate values of the adjacent characteristic points are compared with each other. When the X-coordinate value of the characteristic point of the latter order is smaller than that of the characteristic point of the former order, the line segment is discriminated as a "black-below line segment". The line segment is on the contrary discriminated as a "white-below line segment" if the X-coordinate value of the characteristic point of the latter order is greater than that of the characteristic point of the former order. Here, the characteristic point of the last order on a single closed loop is handled as being of a preceding order relative to the characteristic point of the first order on the same closed loop.

The following table shows "black-below line segments" and "white-below line segments" with respect to the example illustrated in FIG. 1.

| | First loop | Second loop |
|---|---|---|
| Black-below line segments | $\overline{P_6P_7}$, $\overline{P_7P_8}$, $\overline{P_8P_1}$ | $\overline{P_9P_{12}}$ |
| White-below line segments | $\overline{P_1P_2}$, $\overline{P_2P_3}$, $\overline{P_3P_4}$, $\overline{P_4P_5}$, $\overline{P_5P_6}$ | $\overline{P_9P_{10}}$, $\overline{P_{10}P_{11}}$, $\overline{P_{11}P_{12}}$ |

In the manner described above, a graphic pattern of desired characters, patterns of marks and the like may be recorded as binary data by controlling the exposure with a one-dimensional output unit on the basis of the Y-coordinate values of the points where a scanning line having a certain X-coordinate value crosses with the contour of each of font patterns of characters, marks and the like arranged in accordance with a desired layout as well as on the basis of information about whether these crossing points are exposure-starting points or exposure-finishing points.

Figure 3:
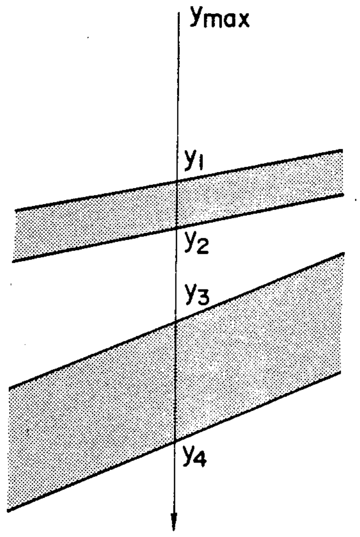
FIG. 3 is a drawing for explaining a procedure to be followed for obtaining exposure-controlling data.

Supposing that the Y-coordinate value of a scanning starting bit is "$y_{max}$", the Y-coordinate values of the exposure-starting points "$y_1$", "$y_3$", . . . , and the Y-coordinate values of the exposure-finishing points "$y_2$", "$y_4$", . . . as shown in FIG. 3, the exposure-controlling data may be obtained as exposure-controlling run-length data on the basis of the data on these coordinate values and the number of bits in the exposing section and that in the non-exposing section.

In other words, the coordinate values of all the crossing points are sorted depending on whether they are exposure-starting points or exposure-finishing points. The thus-sorted coordinate values are then merged in the increasing (or decreasing) order to obtain run-length data.

The above procedure may be illustrated as follow, taking the example of FIG. 3 as an example.

| | Sorting | Merge |
|---|---|---|
| Black below | $y_1^B$, $y_3^B$, . . . ↘ | |
| | | $y_{max}$, . . . $y_1^B$, $y_2^W$, $y_3^B$, $y_4^W$, . . . |
| White below | $y_2^W$, $y_4^W$, . . . ↗ | |

Here, the letters "B" and "W" which are attached respectively to the coordinate values indicate whether the crossing points corresponding the coordinate values are exposure-starting or exposure-finishing points.

In a single font pattern, exposure-starting points and exposure-finishing points obviously appear alternately. In some layout designs, it is often carried out to make a plurality of patterns overlap so that a synthesized pattern can be obtained.

Figure 4:
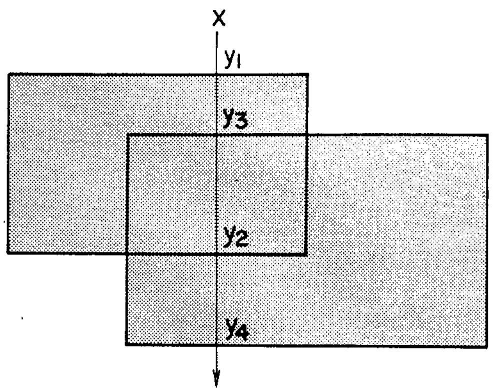
FIG. 4 is a drawing illustrating, by way of example, a procedure in which two rectangular patterns are overlapped to put them together into a synthesized pattern.

An extemely simple example is shown in FIG. 4, in which two rectangular patterns are put together to obtain a synthesized pattern. When their sorting and merge are carried out following the above-described procedure, they can be illustrated as follows:

| | Sorting | Merge |
|---|---|---|
| Black below | $y_1^B$, $y_3^B$ ↘ | |
| | | $y_1^B$, $y_4^W$ |
| White below | $y_2^W$, $y_4^W$ ↗ | |

Namely, two exposure-startin points (black below) appear continuously and two exposure-finishing points (white below) appear continuously in the latter stage in the above example. In this case, the intermediate "$y_3^B$" and "$y_2^W$" are ignored and the exposure is controlled by run-length data which employ "$y_1^B$" as a starting point and "$y_4^W$" as a finishing point.

Figure 5:
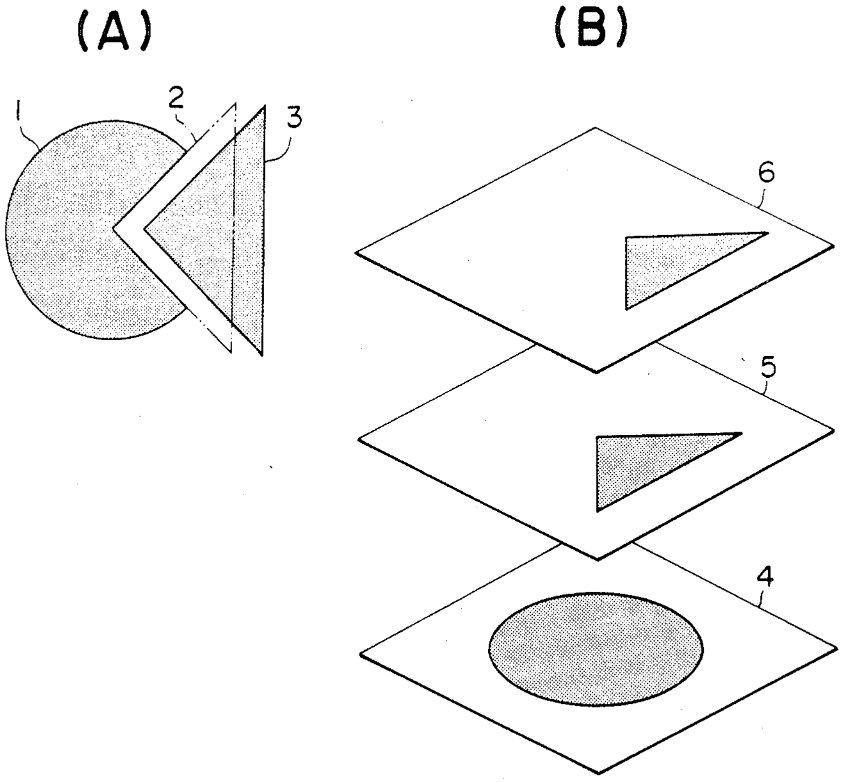
FIGS. 5(A) and 5(B) are drawings showing, by way of example, a procedure in which a plurality of patterns are put together and the overlapped part is represented by leaving the part as a white pocket.
Figure 6:
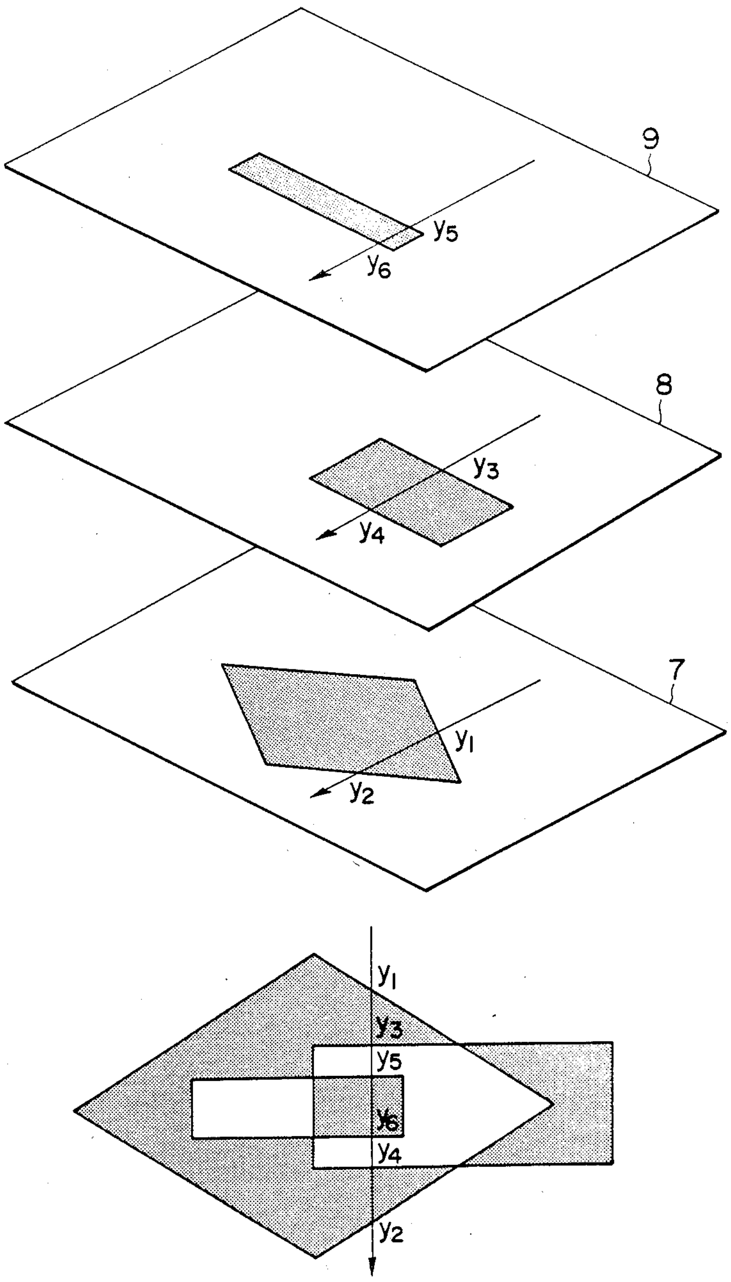
FIG. 6 shows, by way of example, a procedure in which a plurality of patterns are put together and the overlapped parts are represented by subjecting their colors to "black/white reversing"

In certain layout designs, a plurality of patterns as illustrated in FIG. 5 or FIG. 6 are put together and overlapped parts are shown as "white pockets" or "black/white reversed pockets".

In order to obtain data for controlling such a pattern, it is first assumed that layers respectively containing one of individual unit patterns to be put together are superposed. By giving each of the layers an attribute which governs the data of its lower layer, it is possible to produce desired controlling data (As opposed to the logical operation of data among such different layers, the logical operation in such a case as illustrated in FIG. 4 may be considered to be a logical operation within the same layer).

Either one of the following three attributes is given to each of the layers:

(I) to make the closed loop region of the pattern in the lower layer black;

(II) to make the closed loop region of the pattern in the lower layer white; and (III) to make the closed loop region of the pattern in the lower layer reversed from black to white or from white to black.

These attributes govern the nature of patterns to be produced when logical operations are carried out on layers laid underneath their corresponding layers which contain the attributes respectively.

In the example shown in FIG. 5, it is assumed that necessary unit patterns are contained respectively in three layers illustrated in FIG. 5(B) in order to produce such a pattern as depicted in FIG. 5(A). The attribute "I" is given to the lowermost layer 4 which contains a circle 1. To the middle layer 5 containing a triangle 2 corresponding to a region of the circle 1 at which region the black color has been reversed to the white color, the attribute "II" is given. On the other hand, the attribute "I" is given to the uppermost layer 6 which contains a triangle 3 to be overlapped with the reversed region. By conducting a logical operation, exposure image data correspongnging to the synthesized pattern shown in FIG. 5(A) are obtained.

In the example depicted in FIG. 6, the attribute "I" is given to the lowermost layer 7 while the attribute "III" is given to each of the middle layer 8 and uppermost layer 9. Where two or more layers bearing the attribute "III" are overlapped, the black/white reversing is carried out for each layer, thereby obtaining such a synthesized pattern as illustrated in the lower part of the drawing.

These logical operations may be carried out in the following manner.

Figure 8:
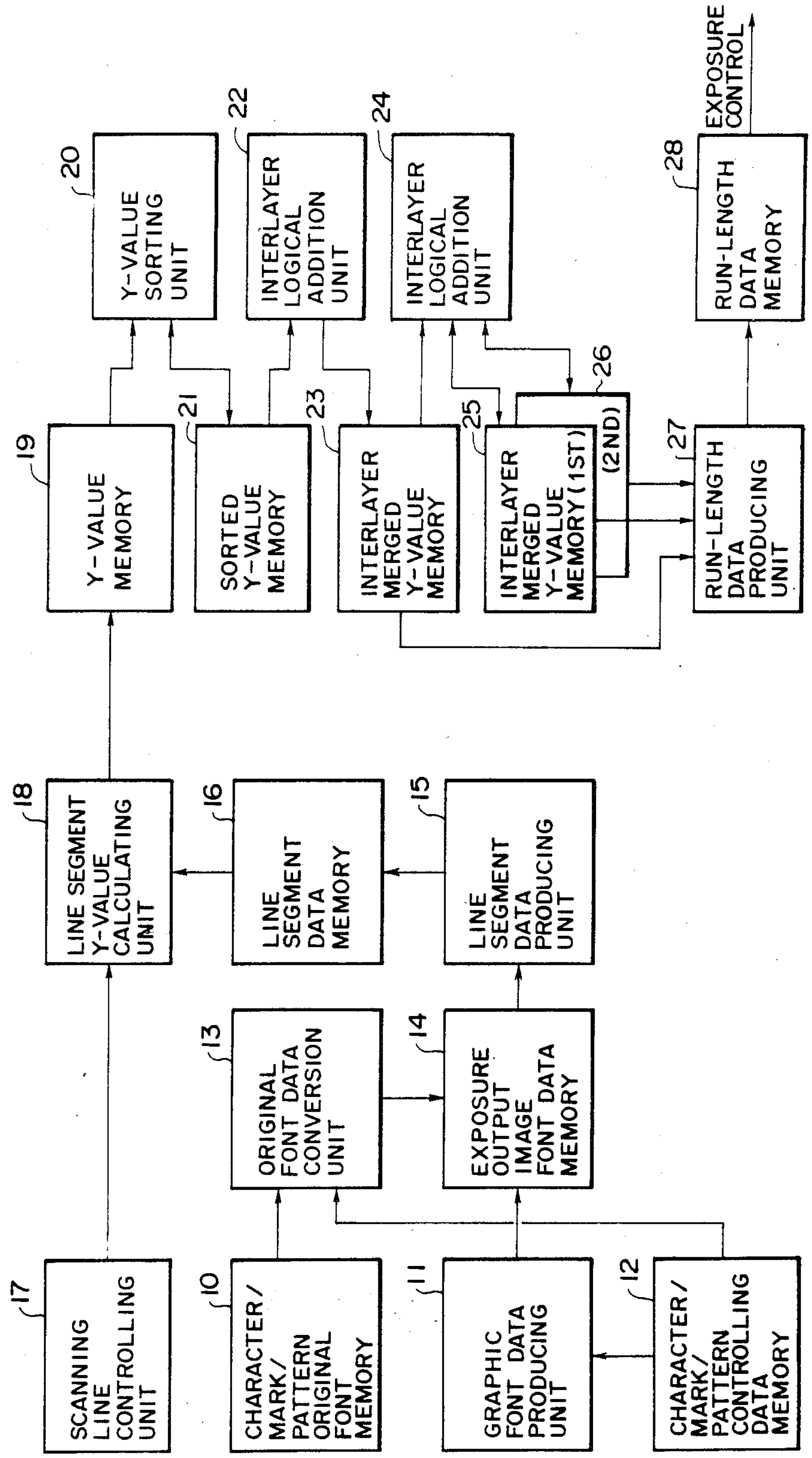
FIG. 8 is a block diagram showing one example of a system adapted to practice the method of this invention.
Figure 9:
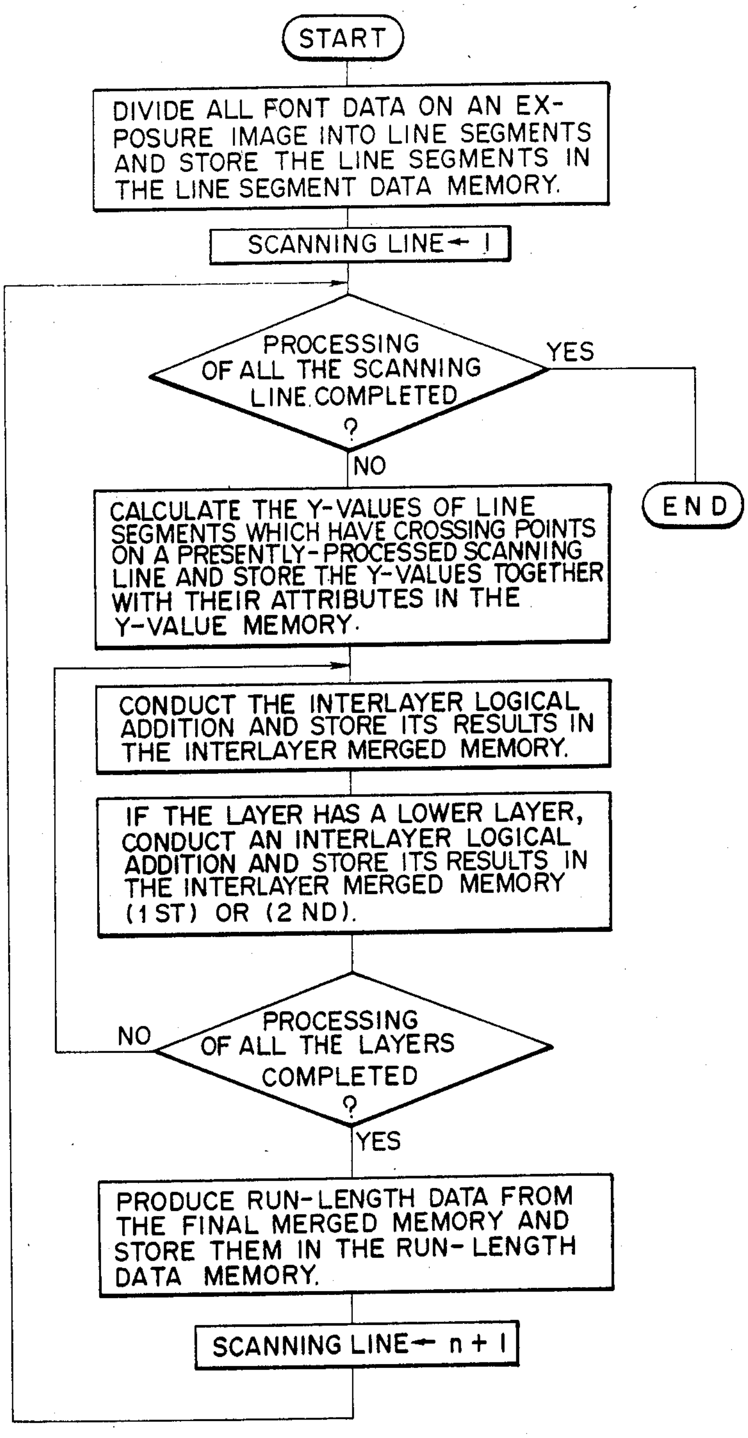
FIG. 9 is a flow chart of the system of FIG. 8.

FIG. 8 is a block circuit diagram showing a system adapted to practice the method of this invention. Although the system will be described later in this specification, it is equipped with three memories, namely, a memory 23 for Y-coordinate values merged in the same layer, a first memory 25 for Y-coordinate values merged between different layers, and second memory 26 for Y-coordinate values merged between different layers. For the convenience in description and understanding, these memories will hereinafter be abbreviated as "interlayer memory 23", "first interlayer memory 25" and "second interlayer memory 26" respectively.

Let's now assume that "i pieces" of layers respectively containing necessary unit patterns are overlapped to form a desired synthesized pattern. With respect to the patterns from the first layer to the (i-l)th layer, their interlayer logical operations are assumed to have been completed and the operation results are also assumed to have already been stored in the first interlayer memory 25 (or in the second interlayer memory 26). On the other hand, it is also assumed that the result of an interlayer logical operation for the final i-th layer has been stored in the interlayer memory 23.

Here, the Y-coordinate values "$y1, y2, y3, \ldots, y_n$" are stored in order in the first interlayer memory 25 and the interlayer memory 23. The Y-coordinate values are arranged in such a way that the "white below" and the "black below" appear alternately.

In accordance with the attribute "I", "II" or "III" given to the i-th layer, the Y-coordinate values stored in both of the memories 23, 25 are subjected to merge processing. Results of the merge processing are stored in the second interlayer memory 26 (or in the first interlayer memory 25 when the results of the logical operations on the first layer to the (i-l)th layer have been stored in the second interlayer memory 26). This merge processing is carried out in the following manner depending on each attribute and the manner of overlapping of patterns.

(1) When the attribute "I"(to make the lower layer black) has been given to the i-th layer, and (1-1) when the black section ($y_k{}^i$, $y_{k+1}{}^i$) in the i-th layer falls within the white section ($y_l{}^\Sigma$, $y_{l+1}{}^\Sigma$of operation results (hereinafter abbreviated as "$\Sigma^i$") from the first layer to the (i-l)th layer, they are merged as:

$\ldots, y_l{}^\Sigma, y_k{}^i, y_{k+1}{}^i, y_{l+1}{}^\Sigma, \ldots;$ (1-2) when the black section ($y_k{}^i$, $y_{k+1}{}^i$) in the i-th layer extends over the white section ($y_l{}^\Sigma$, $y_{l+1}{}^\Sigma$) of $\Sigma^i$ and its subsequent black section ($y_{l+1}{}^\Sigma$,$y_{l+2}{}^\Sigma$), they are merged as:

$\ldots, y_l{}^\Sigma, y_k{}^i, y_{l+2}{}^\Sigma, \ldots;$ (1-3) when the black section ($y_k{}^i$, $y_{k+1}{}^i$) in the i-th layer extends over the black section ($y_l{}^\Sigma$, $y_{l+1}{}^\Sigma$) of $\Sigma^i$, and its subsequent white section ($y_{l+1}{}^\Sigma$, $y_{l+2}{}^\Sigma$), they are merged as:

$\ldots, y_l{}^\Sigma, y_{k+1}{}^i, y_{l+2}{}^\Sigma, \ldots;$ and (1-4) when one of the black sections contains the other black section in its entirety, the thus-contained black section is ignored. (2) When the attribute "II" (to make the lower layer white) has been given to the i-th layer, and (2-1) when the black section ($y_k{}^i$, $y_{k+1}{}^i$) in the i-th layer falls within the white section ($y_l{}^\Sigma$, $y_{l+1}{}^\Sigma$) of $\Sigma^i$, the black section is ignored;

(2-2) when the black section ($y_k{}^i$, $y^i{}_{k+1}$) in the i-th layer extends over the white section ($y_l{}^\Sigma$, $y_{l+1}{}^\Sigma$) of $\Sigma^i$ and its subsequent black section ($y_{l+1}{}^\Sigma$, $y_{l+2}{}^\Sigma$), the are merged as:

$\ldots, y_l{}^\Sigma, y_{k+1}{}^i, y_{l+2}{}^\Sigma, \ldots;$ (2-3) when the black section ($y_k{}^i$, $y_{k+1}{}^i$) in the i-th layer extends over the black section ($y_l{}^\Sigma$, $y_{l+1}{}^\Sigma$) of $\Sigma^i$ and its subsequent white section ($y_{l+1}{}^\Sigma$, $y_{l+2}{}^\Sigma$), they are merged as:

$\ldots, y_l{}^\Sigma, y_k{}^i, y_{k+1}{}^i, y_{l+1}{}^\Sigma, \ldots;$ and (2-4) when the black section ($y_k{}^i$, $y_{k+1}{}^i$) in the i-th section is contained within the black section ($y_l{}^\Sigma$, $y_{l+1}{}^\Sigma$) of $\Sigma^i$, they are merged as: $\ldots, y_l{}^\Sigma, y_k{}^i, y_{k+1}{}^i, y_{l+1}{}^\Sigma, \ldots$ (3) when the attribute "III" (the black and white colors are reversed in the lower layer) has been given to the i-th layer and "y" of $\Sigma^i$ are merged in the increasing (or decreasing) order.

The logical operation between data in different layers can be carried out in the manner described above, namely, by conducting their merge suitable in accordance with the attribute given to the i-th layer and the manner of overlapping of the patterns.

When the logical operations of interlayer and interlayer pattern data have been completed and the Y-coordinate values of the exposure-starting point and exposure-finishing point of each of patterns to be finally exposed and recorded have been obtained as merged y values, there are then produced, on the basis of the thus-merged y values, run-length data adapted to control the one-dimensional output unit.

The above run-length data are given as differences between the y values and their adjacent y values and then converted to run-length data for a single scanning line by adding the maximum value "$y_{max}$" of the y values in the exposed image region to the beginning of the differences.

Figure 7:
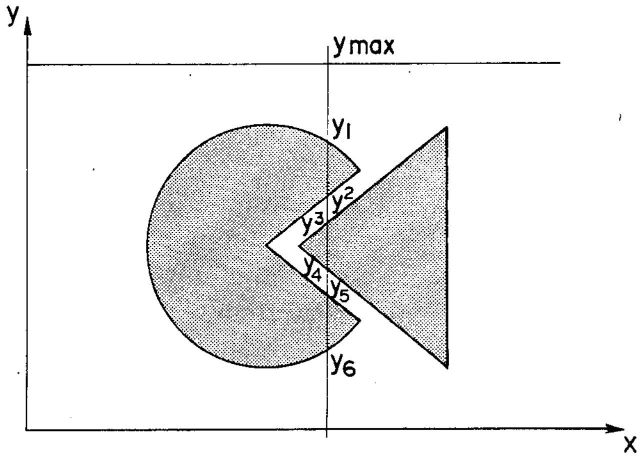
FIG. 7 is similar to FIG. 5(A) and illustrates run-length data.

For an ordinary pattern, the run-length data starts from white data whose scanning-starting bit has been turned "ON". For example, in the case of the pattern illustrated in FIG. 7 which pattern is identical to that shown in FIG. 5, run-length data are given as follows:

| Controlling data | Region | Run-length |
|---|---|---|
| 1Ø | white | $y_{max}-y_1$ |
| Ø1 | black | $y_1-y_2$ |
| ØØ | white | $y_2-y_3$ |
| Ø1 | black | $y_3-y_4$ |
| ØØ | white | $y_4-y_5$ |
| Ø1 | black | $y_5-y_6$ |
| . | . | . |
| . | . | . |
| . | . | . |

In the above table, the controlling data (1Ø) indicates white (unexposed) which begins from the scanningstarting point. On the other hand, (Ø1)and (ØØ) indicate black (exposed) and white (unexposed) respectively.

FIG. 8 is a block diagram showing the construction of a system useful in the practice of the above-described data processing method.

An original font memory 10 is a memory in which data on individual patterns such as characters, marks and the like are stored. As described with reference to FIG. 1, the original font memory 10 contains the coordinate values of characteristic points of such fonts, which coordinate values have been determined in accordance with coordinate systems respectively specific to the fonts, the numbers of closed loops, and the number of characteristic points on each closed loop. An operator's operation output data on desired fonts and delivers them to an original font data conversion unit 13. When carrying out a merge operation between different layers, the aforementioned three types of attribute data are also input.

A graphic font data producing unit 11 is a unit adapted to supply data on geometrical patterns, which can be represented by curvilinear equations to an exposure output image font data memory 14 in accordance with a given layout, as described above.

It is however advantageous, as actual data, to make necessary curves approximated by their corresponding polygons and to carry out the operation in the same manner as character fonts by using the vertexes of the polygons as their characteristic points, so that they can be processed in the same manner as character fonts and the like.

Incidentally, data on rules and the like are also produced at the graphic font data producing unit 11.

A character/mark/pattern controlling data memory 12 produces, in accordance with operator's instructions, data production common signals for the graphic font data producing unit 11 and data conversion command signals for the original font data conversion unit 13.

The original font data conversion unit 13 applies such processing as magnification-changing processing, angular transformation processing, rotation processing or the like to each font data input from the original font memory 10 in accordance with a given layout. In addition, the original font data conversion unit 13 determines, through operation, the coordinate values of each characteristic point in accordance with the arrangment of each font on the area of the given layout and supplies the operation results to the next stage, namely, the exposure output image font data memory 14.

Accordingly, data on the fonts such as characters, marks, patterns and/or the like which have been arranged in accordance with the given layout to complete a full picture frame are stored in the form of coordinate values of their respective characteristic points in the exposure image font data memory 14.

These characteristic points have already been numbered in every fonts. A line segment data producing unit 15 obtains, through operation, data on line segments connecting successively adjacent characteristic points and the operation results are then fed to and stored in the subsequent unit, i.e., a line segment data memory 16. The data on each line segment are given as a line segment equation which connects its respective two points, and also contains, as mentioned above, either one of the three attributes when the line segment requires a distinction whether it is "black below" or "white below" and a interlayer logical addition operation.

A scanning line controlling unit 17 outputs data on the X-coordinate values of scanning lines which scan successively the area of the above-mentioned layout in the direction of the Y-axis. A line segment Y-coordinate value calculating unit 18 calculates, on the basis of the line segment data stored in the memory 16 and the X-coordinate value data of the scanning lines, the Y-coordinate values (thereinafter abbreviated as "Y-values") of the crossing points between the scanning lines and the contours of the fonts and inputs and stores the Y-values in a Y-value memory 19.

A Y-value sorting unit 20 sorts the Y-coordinate values of the crossing points, which values have been stored in the Y-value memory 19, depending whether the crossing points are exposure-starting points (black below) or exposure-finishing points (white below) and stores the results of the sorting in a sorted Y-value memory 21. These data are then subjected to merge processing, which has already been explained above with reference to FIG. 4, at an interlayer logical addition unit 22 and the resulting data are then stored in an interlayer merged Y-value memory 23.

The interlayer logical addition unit 24 as well as the first and second interlayer merged Y-value memories 25, 26 have already been described above.

A run-length data producing unit 27 produces data on the Y-coordinate values of exposure-starting points and then the lengths to be exposed (the number of picture elements) on the basis of the Y-coordinate values stored in these memories. The thus-produced data are thereafter stored in the subsequent run-length data memory 28. These run-length data are then read out in synchronization with the scanning of the recording one-dimensional output unit, whereby controlling the exposure of the unit and recording a binary picture image pattern arranged in accordance with the given layout.

Having now fully described the invention, it will be apparent to one of ordinary skill in the art that many changes and modifications can be made thereto without departing from the spirit or scope of the invention as set forth herein.

What is claimed is:

1. A method for converting a graphic pattern expressed in terms of binary signals into run-length data so as to duplicate and record the graphic pattern, said method including storing the graphic pattern in a memory on the basis of data on the contours of the graphic pattern and controlling the output of a one-dimensional output unit in accordance with the latter data, which method comprises:

outputting data on each of the line segments, which respectively and successively connect adjacent characteristic points on the contours of the graphic pattern, in accordance with the coordinate values of the mutually-adjacent two characteristic points between which the line segment extends;

determining the Y-coordinate value of the crossing point between each scanning line in the Y-axis direction and each of the line segments in the one-dimensional output unit;

discriminating, on the basis of the order of each of the characteristic points and the relative magnitude of the X-coordinate value of each of the adjacent characteristic points, whether the crossing point is positioned at either the leading edge portion or the trailing edge portion of the black region of the pattern relative to the scanning direction of the scanning line; and controlling the output of the one-dimensional output unit in accordance with the Y-coordinate value of the crossing point and the result of the discrimination.

2. A method according to claim 1, wherein the order of each of the characteristic point is determined by tracing its respective contour in such a manner that the black region of the pattern comes to the left side (or the right side) of the contour, the X-coordinate values of the mutually-adjacent two characteristic points are compared with each other, and the crossing point on the line segment connecting the two characteristic points is discriminated as located in the leading edge portion of the black region of the pattern when the X-coordinate value of the characteristic point of the latter order is smaller (or greater) than the X-coordinate value of the characteristic point of the former order but the crossing point on the line segment connecting the two characteristic points is discriminated as located in the trailing edge portion of the black region of the pattern when the X-coordinate value of the characteristic point of the latter order is on the contrary greater (or smaller) than the X-coordinate value of the characteristic point of the former order.

3. A method according to claim 2, wherein the crossing point in the leading edge portion of the black region of the pattern is chosen as the starting point of a recording and the crossing point in the trailing edge portion of the black region of the mark is selected as the finishing point of the recording, both by means of a one-dimensional output unit.

4. A method according to claim 1 wherein a plurality of types of graphic patterns is individually stored in accordance with an X-Y coordinate system in a memory, one or more of the graphic patterns are arranged in accordance with a desired layout as needed out of the plurality of kinds of graphic patterns, and the X-Y coordinate value of each of the thus-arranged graphic patterns are converted, on the basis of the arrangement of each of the graphic patterns on the layout, into coordinate values in the coordinate system on the layout for processing the X-Y coordinate values of each of the thus-arranged graphic patterns.

5. A method according to claim 4, wherein the arrangement of each graphic pattern on the layout includes, with respect to said graphic pattern, the determination of the location thereof and a variety of modifications.

6. A method according to claim 5, wherein the modifications are selected from the group consisting of a modification in magnification, elongation in the vertical direction, flattening, inclination and rotation.

7. A method according claims 1, wherein a plurality of graphic patterns is arranged one over another at a same part of the layout, the Y-coordinate values of the crossing points in the graphic patterns are sorted in accordance with a standard whether the crossing points are starting points of recording or finishing points of the recordings, and the thus-sorted Y-coordinate values are then subjected to merging processing so as to obtain the run-length data.

8. A method according claims 1, wherein a plurality of graphic patterns is arranged one over another at a same part on a layout, the positional orders of the graphic patterns are determined, and each of the graphic patterns is added with an attribute adapted to control the recording of its lower graphic pattern, whereby to control the recording or non-recording of a region of a reproduced pattern which region corresponds to the black region of the upper pattern.

9. A method according to claim 8, wherein the attribute is selected from three types of attributes which consist of "black below", "white below" and "black/white reversed below".

10. A system for processing data on a binary graphic pattern, comprising:

a first memory adapted to store the graphic pattern expressed in terms of binary signals by means of the X-Y coordinate values of each characteristic point on each contour of the graphic pattern;

a data conversion unit adapted to read out data stored in the first memory and convert the same in accordance with a desired layout;

a second memory adapted to store the thus-converted data;

a first unit adapted to generate, on the basis of the data from the second memory, data indicating whether the line segments which respectively connect the mutually adjacent characteristic points of the graphic pattern are individually located at the record-starting side or the record-finishing side relative to the scanning direction of a scanning line;

a third memory adapted to store the data on the line segments;

a scanning line controlling unit adapted to generate scanning line controlling data so as to scan the area of the layout successively in the direction of the Y-axis;

a unit adpated to calculate the Y-coordinate value of each of the crossing points of the scanning lines and line segments on the basis of the line segment data stored in the third memory and the scanning line controlling data;

a fourth memory adapted to store the Y-coordinate values; and a second unit adapted to produce, in accordance with the Y-coordinate values stored in the fourth memory and the data indicating whether the crossing points are each located at either the record-starting side or record-finishing side, run-length data for controlling a recording output unit.

* * * * *